United States Patent [19]

Bogard

[11] Patent Number: 4,861,092
[45] Date of Patent: Aug. 29, 1989

[54] PICK-UP TRUCK TONNEAU COVER

[76] Inventor: Donald E. Bogard, 22204 Dolphin Ct., Dearborn Heights, Mich. 48127

[21] Appl. No.: 78,528

[22] Filed: Jul. 28, 1987

[51] Int. Cl.$^4$ .............................................. B60D 7/02
[52] U.S. Cl. .................................................. 296/100
[58] Field of Search ....................... 296/100, 216, 218

[56] References Cited

U.S. PATENT DOCUMENTS

| | | | |
|---|---|---|---|
| 3,420,570 | 1/1969 | Kunz | 296/100 |
| 4,261,611 | 4/1981 | Barry et al. | 296/100 |
| 4,418,954 | 12/1983 | Buckley | 296/100 |
| 4,482,589 | 11/1984 | Widman | 296/31 P |

*Primary Examiner*—Robert R. Song
*Attorney, Agent, or Firm*—Alex Rhodes

[57] ABSTRACT

A lightweight tonneau cover for covering the open bed of a pick-up truck which can be easily and quickly installed and removed by one person. The cover has lockable front and rear panels joined together for rotation about an axis from an in-line arrangement to completely cover the bed of a pick-up truck and to a compact side-by-side arrangement for shipping, handling, installing, removal and storage. The cover is retained to the pick-up truck by a pair of caliper type latches mounted in the sides of the cover panels. The caliper latches are retained and released from retention posts in body side members of a pick-up truck by merely rotating the panels. When the panels are in-line and cargo bed covering relationship, the jaws of the caliper latches are closed and in locking engagement with the retention posts. When the front or both front and rear panels are rotated to a side-by-side relationship, the jaws of the caliper latches are opened and the cover can be installed or removed from the vehicle.

2 Claims, 5 Drawing Sheets

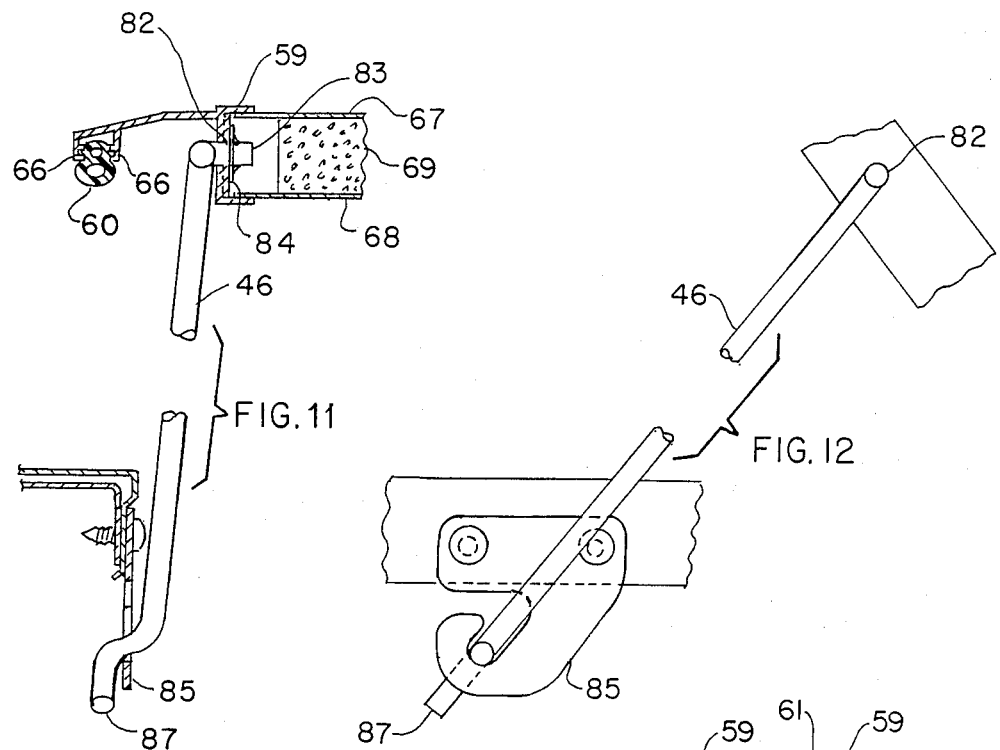
FIG. 11
FIG. 12
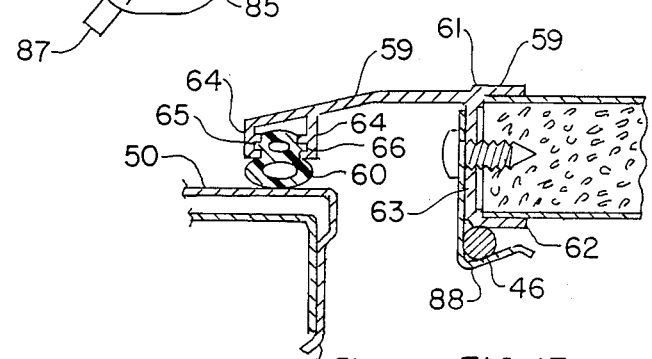
FIG. 13
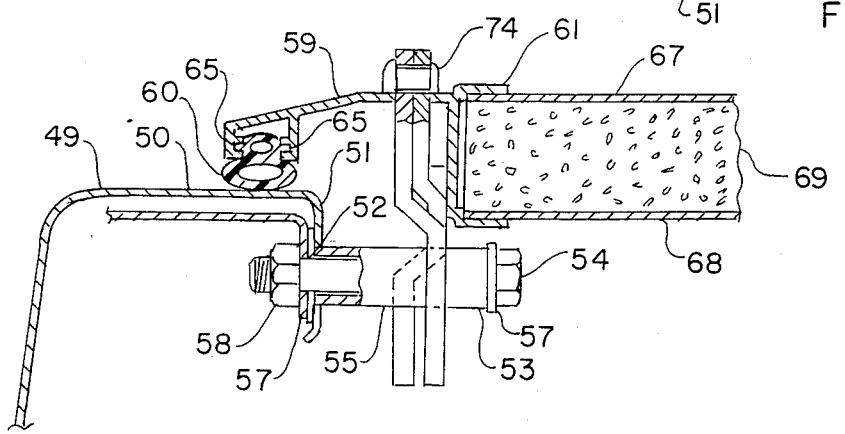
FIG. 14

PICK-UP TRUCK TONNEAU COVER

BACKGROUND OF THE INVENTION

A variety of tonneau covers for covering open beds of trucks, including canvas, single panels and caps, and multi-piece covers of interconnected panels exist in the prior art. Despite their obvious benefit of providing security and protection to the cargo and the open bed, as yet, none have achieved the widespread popularity one would expect among pick-up truck owners.

One reason is that tonneau covers have been costly and difficult to install and remove for storage. Another reason is that they have required more than one person to install and remove. Still another reason is that many initial installations have required special skills. Still yet another reason is that tonneau covers have been awkward to handle because of their shape and size.

With the foregoing in mind, it will be appreciated that an economical, lightweight, easily installed, tonneau cover, requiring only one person for installation and removal, would provide needed improvements over the prior art. Moreover, if the cover could be folded into a compact arrangement for handling and storage, it would be an even more desirable improvement over the prior art.

SUMMARY OF THE INVENTION

The present invention is directed to a tonneau cover for covering the open bed of a pick-up truck and more particularly to a lightweight cover which can be easily and quickly installed and removed by one person.

The tonneau cover has lockable front and rear panels joined together for rotation about a central axis which is transverse to a vehicle. The panels are individually rotatable to a horizontal in-line arrangement to completely cover a cargo bed of a pick-up truck and to a compact side-by-side arrangement for shipping, handling, installation, removal and storage. The cover is retained to the pick-up truck by a pair of caliper latches mounted to the sides of the cover panels which engage retention posts mounted to the cargo bed of the truck. The caliper latches are combined with hinges which rotatably join the panels and the jaws of the caliper latches are opened and closed by merely rotating the panels.

The retention posts project inwardly from the center portion of the body side panels at the side margins of the open bed. When the panels are in-line and in covering relationship to the cargo bed, the jaws of the caliper latches at the sides of the cover are closed and in locking engagement with the retention posts. When either the front or rear panels are rotated to position them in a side-by-side relationship, the jaws of the caliper latches are open such that the latches may be disengaged from the pins and the cover removed from the retention posts.

The sides of the panels are trimmed with extruded moldings which enhance the appearance of the cover and provide attachments for sealing strips to seal the joint between the cover and the cargo bed.

A principal feature of the invention is that the cover can be secured or released from a pick-up truck bed by merely rotating the front or rear panels. Thus, the cover may be easily and quickly mounted and removed by the simple procedure of rotating the panels to change their relative positions.

An important benefit of the invention is that it eliminates the difficult task of aligning and engaging close fitting members during the intallation of a tonneau cover.

Another benefit of the invention is that the panels may be folded into a contiguous arrangement to reduce shipping costs, and facilitate storage and off-vehicle handling of the cover.

Another benefit is that the rotatable panels may separately be partially or fully opened to transport large objects or gain access to the forward or rearward portions of the cargo space.

It is a primary object of the invention to provide a lightweight demountable cover for a pick-up truck which can be easily and quickly installed and removed by one person.

It is another object in addition to the foregoing object, to provide a pick-up truck tonneau cover which can be folded into a compact arrangement for handling and storage.

It is another object in addition to the foregoing object to provide an economical tonneau cover which can be manufactured at a nominal investment.

The foregoing benefits, features and objects, as well as additional features, benefits and objects, will become apparent from the ensuing description and drawings which describe the invention in detail. A preferred embodiment, the best mode contemplated in practicing the invention are disclosed, and the subject matter in which exclusive property rights are claimed is set forth in each of the numbered claims at the conclusion of the description.

BRIEF DESCRIPTION OF THE DRAWINGS

FIG. 11 is a cross-sectional view taken on the line 11—11 of FIG. 1, showing a prop rod for supporting the front panel of the tonneau cover in an elevated position.

FIG. 12 is a view of the prop rod of FIG. 11 taken in the direction of arrow A.

FIG. 13 is a cross-sectional view taken on the line 13—13 of FIG. 1 showing the prop rod retained to the front panel with a spring clip.

FIG. 14 is a cross-sectional view taken on the line 14—14 of FIG. 1 showing the construction of the combined hinge and latching post.

DETAILED DESCRIPTION OF THE PREFERRED EMBODIMENT

Figure 4:
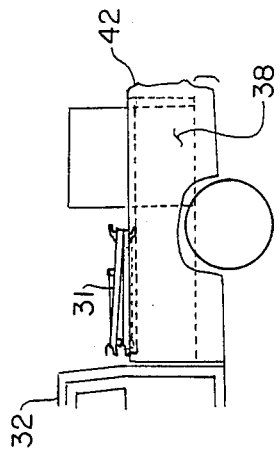
FIG. 4 is a side view of the pick-up truck of FIG. 1 with the rear panel of the tonneau cover resting on the front panel and a large article carried in the rear of the cargo bed.

Referring now to the drawings wherein like numerals designate like and corresponding parts through the several views, in the particular embodiment 43 disclosed for illustrative purposes in FIGS. 1 through 16, inclusive, rectangular front 30 and rear 31 panels are rotatably joined together and retained to the bed 36 of a pick-up truck 33 by caliper latches 71 at the sides of the cover 43 which engage posts 53 fixedly attached to side panels 36 of the truck 33.

Figure 1:
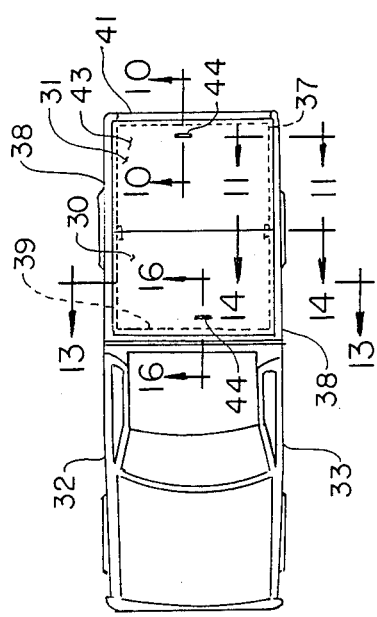
FIG. 1 is a plan view of a pick-up truck and tonneau cover, covering the bed of the truck. The tonneau cover has a front panel and a rear panel pivotally joined to the front.
Figure 2:
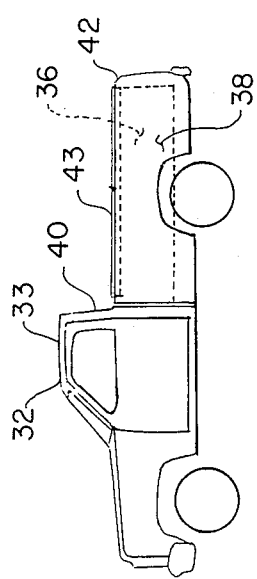
FIG. 2 is a side elevation view of the pick-up truck and tonneau cover of FIG. 1.

The pick-up truck 33 of FIGS. 1 and 2 is conventional and has a forward cab 32 and an open bed 36 extending rearwardly from the cab 32 for carrying cargo. The side margins 37 of the open bed 36 are bounded by the pair of spaced apart vertical panels 38 in parallel relationship. The forward end margin 39 of the bed 36 is bounded by the rear wall 40 of the cab 32 extending from a pair of corresponding ends of the side panels 38 and the opposite rear end margin 41 is bounded by a rotatably mounted gate 42 extending from an opposite pair of corresponding ends of the side panels 38.

The application of the tonneau cover 43 is illustrated in FIGS. 1-6. When the bed 36 is completely covered, the panels 30, 31 are positioned horizontally in-line on top of the cargo bed 36. At the ends of the cover panels 30, 31, lock assemblies 44 are provided for preventing access to the cargo bed 36 and resisting the upward pull of aerodynamic forces on the panels 30, 31 when the vehicle 33 is in motion. The lock assemblies 44 are secured to the upper edge portions of the ends of the front 30 and rear 31 panels by nuts 45 or other suitable means. The lock assembly 44 of the rear panel 31 also secures the tailgate 42 in the locked position.

Figure 6:
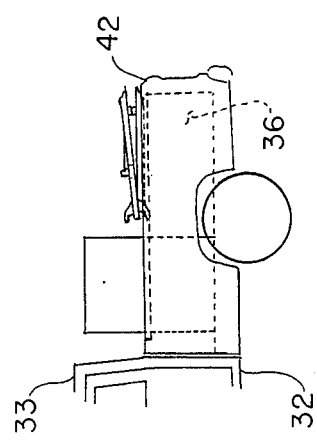
FIG. 6 is a side view of the pick-up truck of FIG. 1 with the front panel of the tonneau cover resting on the rear panel and a large article carried in the front of the cargo box.
Figure 3:
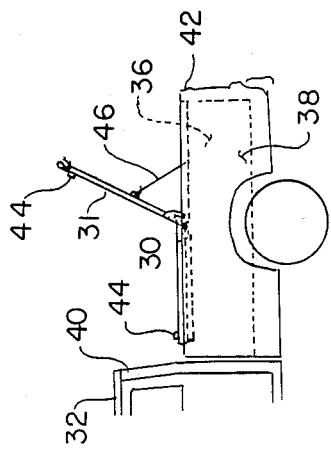
FIG. 3 is a side view of the pick-up truck of FIG. 1 with the rear panel elevated to permit access to the rear of the cargo bed.
Figure 5:
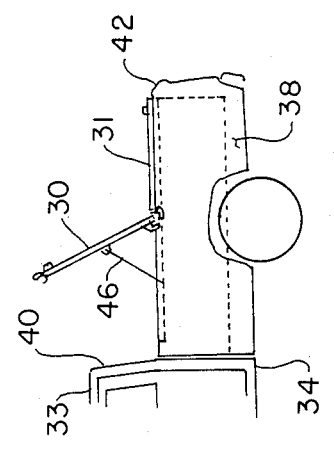
FIG. 5 is a side view of the pick-up truck of FIG. 1 with the front panel of the tonneau cover in an elevated position to permit access to the front of the cargo bed.

With reference to FIGS. 3 and 5, the front 30 and rear 31 panels are shown elevated and supported on prop rods 46 for accessibility to the front and rear of the cargo bed 36. When large articles are transported, one panel 30, 31 can be rotated and rested against the other panel 30, 31 are shown in FIGS. 4 and 6.

Figure 15:
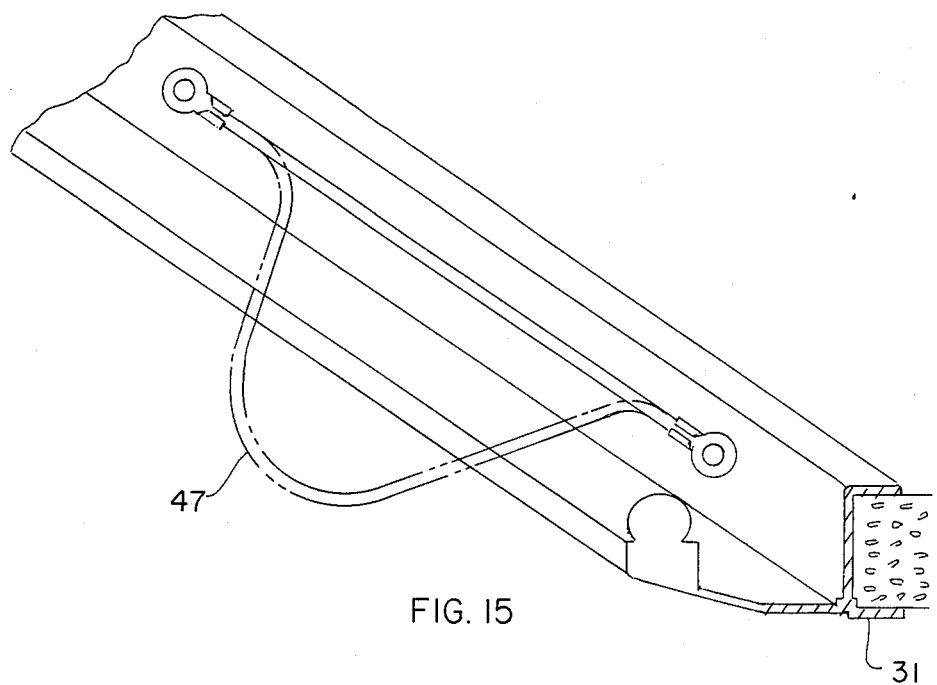
FIG. 15 is a perspective view of the rear panel of the tonneau cover in a rotated position and an elastic hold-down strap for retaining the rear panel to the front when the rear panel is open and rested on the front panel.
Figure 16:
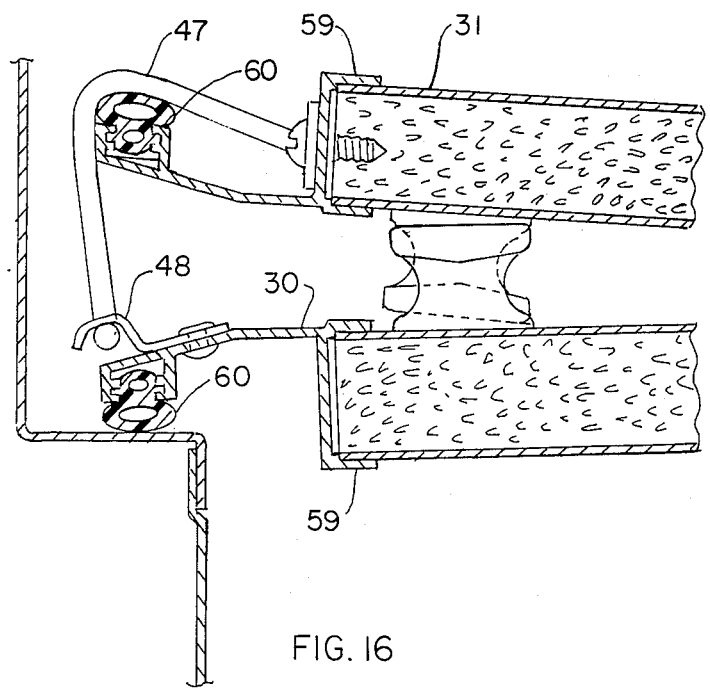
FIG. 16 is a cross-sectional view taken on the line 16—16 of FIG. 1 showing the rear panel retained to the front panel with the elastic strap of FIG. 15.
Figure 17:
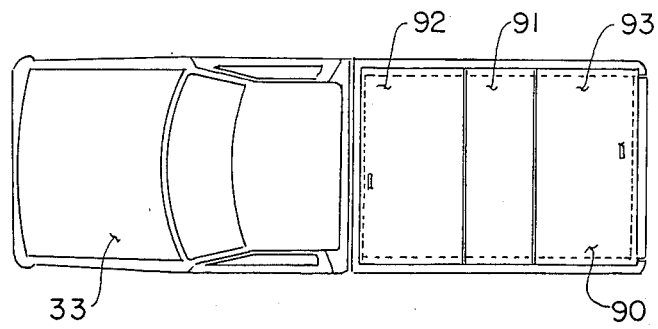
FIG. 17 is side view of the pick-up truck of FIG. 1 and an alternate embodiment of the present invention comprising front and rear panels rotatably mounted to a fixed center panel.
Figure 18:
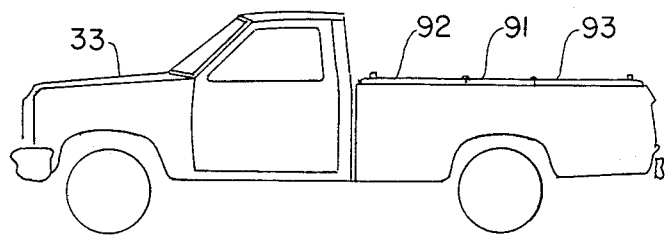
FIG. 18 is a side elevation view of the pick-up truck and tonneau cover of FIG. 17.

Referring now to FIGS. 15 and 16, at the ends of the panels 31 an elastic hold-down strap 47 is provided to retain an open panel 31 to a closed panel 30 when the vehicle 33 is in motion. The end portions of the strap 47 are attached to the edge of the panel 30 and the strap 47 engages a bracket 48 fixedly attached to the closed panel 31.

The upper portions of the truck side panels 38 are rails 49 with short upper horizontal 50 and inner vertical 51 flanges to stiffen the cargo bed structure. With reference to FIG. 14, at the center portions of the vertical flanges 51 of each rail 49 there is provided an aperture 52 which receives the end of a post assembly 53 which retains the tonneau cover 43 to the truck bed 36. The post assembly 53 comprises a bolt 54, a sleeve 55 surrounding the body of the bolt 54, a washer 57 at each end of the sleeve 55, and a nut 58 which retains the bolt 54 to the vertical flange 51 of the rail 49.

Figure 10:
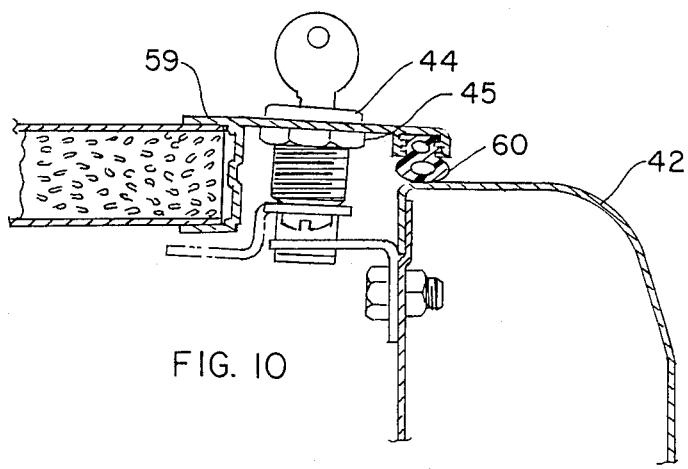
FIG. 10 is a cross-sectional view taken on the line 10—10 of FIG. 1, showing a lock for securing the end portion of the rear panel to the tailgate of the pick-up truck.

A preferred construction of the cover panels 30, 31 is shown in FIG. 10. The panels 30, 31 are composites of thin upper 67 and lower 68 sheets of aluminum adhesively bonded to a cellular plastic core 69. The edge portions of the composites are trimmed with sections of an extruded aluminum molding 59 which is adhesively bonded to the edge portions of the composite structures. At the lower edge portions of the moldings 59 is a weather seal 60 for sealing the joint between the cover 43 and cargo bed 36.

The extruded molding 59 has a horizontal upper wall 61, a spaced apart lower horizontal wall 62, an interconnecting vertical wall 63 and a pair of spaced apart vertical ribs 64 extending downwardly from the upper wall 61. The vertical wall 63, which interconnects the upper 61 and lower 62 walls, is recessed inwardly from the inner edges of molding 59 and receives the composite structure. As shown in FIG. 10, the outer edge portions of the composite structure nest into the recess and are adhesively retained to the molding 59 or by other suitable means.

Referring again to FIG. 10, in the ribs 64, extending downwardly from the upper wall 61, are grooves 65 which retain corresponding ribs 66 which project outwardly from the sides of the weather seal 60. The seal 60 is preferably a tubular part made from a rubber-like material.

The front 30 and rear 31 panels are preferably identical in size and are joined together for rotation about an axis, transverse to the side margins 37 of the truck bed 36 by a strap hinge 70 attached to opposite sides of the panels 30, 31.

The hinge 70, a principal feature of the invention, provides several important advantages over the prior art. One advantage is that the hinge 70 incorporates a caliper type latch which retains the cover 43 to the cargo bed 36. The caliper latches 71 provide the advantage of quick installation and removal of the cover 43 by only one person. Still another advantage is that the hinge 70 is self aligning with the post 53 which retains the tonneau cover 43 to the cargo bed 36.

The strap hinge 70 which joins the front 30 and rear 31 panels consists of a pair of plates 72, 73 connected for rotation by a pin 74. One plate 72 of each hinge 70 is fixedly attached to a side of the front panel 30 and the other plate 73 is fixedly attached to the corresponding side of the rear panel 31. The lower portions of the hinges 70 are the jaws 75 of the caliper latches 71 which cooperate with the retainer posts 53 of the truck bed 36 to retain the cover 43.

Figure 7:
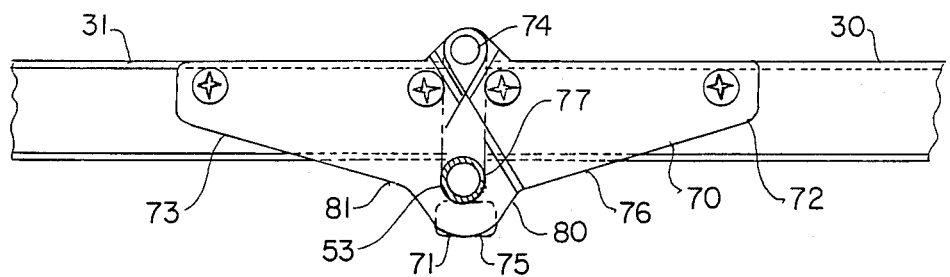
FIG. 7 is a partial side view of the tonneau cover with the front and rear panels in horizontal in-line relationship showing a combined hinge and caliper latch and a cylindrical post for rotatably mounting the panels and retaining the panels to the bed of the pick-up truck.
Figure 8:
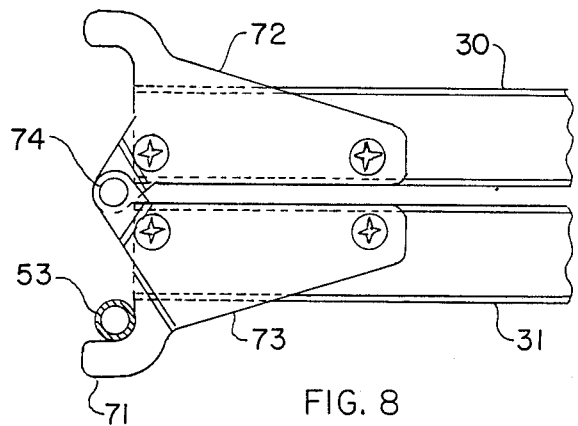
FIG. 8 is a partial side view of the tonneau cover with the front panel resting on the rear panel showing the combined hinge and caliper latch and the post for rotatably mounting the panels and retaining the panels to the bed of the pick-up truck.
Figure 9:
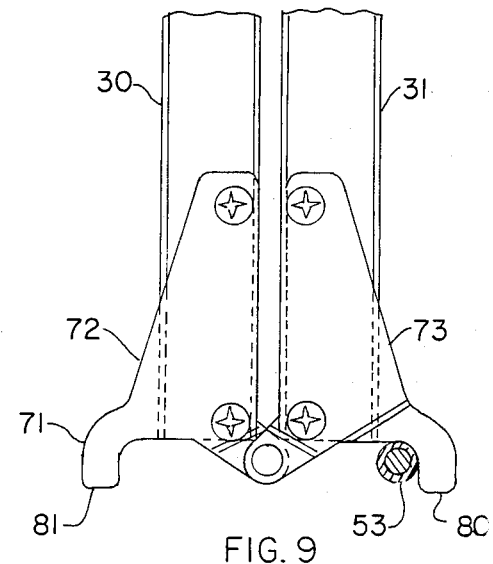
FIG. 9 is a partial side view of the tonneau cover with the front and rear panels in vertical side-by-side relationship showing the combined hinge and caliper latch

The contruction and operation of the combined hinge and caliper latch is best understood by reference to FIGS. 7 through 9. In FIG. 7, the hinge plates 72, 73 are shown with the front 30 and rear 31 panels in-line to completely cover the cargo bed 36. It will be observed that the lower portions of the hinge plates 72, 73 which form the jaws 75 of the caliper latches 71 are in crossing relationship and cooperate to form an aperture 77 for embracing the retaining post 53 to retain the cover 43 to the cargo bed 36.

Referring now to FIG. 8, it will be observed that when the front panel 30 is open and resting on the closed rear panel 31, the caliper jaw 80 of the rear hinge plate 73 embraces the retaining post 53 while the caliper jaw 81 of the front hinge plate 72 is separated from the retainer post 53, whereby the cover 43 may be mounted on or removed from the cargo bed 36.

With reference to FIG. 9, it will be observed that when the front panel 30 and rear panel 31 are vertically disposed in a side-by-side relationship, the jaw 80 of the rear hinge plate 73 again embraces the retainer post 53 and the caliper jaw 81 of the front hinge plate 72 is separated from the retainer post 53, whereby the cover 43 may also be mounted or removed from the cargo bed 36.

A construction and mounting for the prop rods 46 is shown in FIGS. 11 through 13. In the sides of the trim moldings 59 are apertures 82 which receive bent end portions 83 of the prop rods 46. The bent end portions 83 are removably retained for rotation in the moldings 59 by suitable retainers 84.

As shown in FIGS. 11 and 12, at the lower ends of the prop rods 46 vertical brackets 85 with J-slots 86 are suitably attached to the truck side panels 38 and receive bent end portions 87 of the prop rods 46 for retaining the panels 30, 31 in elevated positions. When the prop rods 46 are not in use, they are positioned as shown in FIG. 13 with their end portions 87 retained to the cover panels 30, 31 by spring clips 88 attached to the sides of the cover panels 30, 31.

The preferred method of mounting the tonneau cover 43 on the cargo bed 36 of a pick-up truck 33 is as follows. The panels 30, 31 of the cover 43 are folded together in side-by-side relationship with the rear cover 31 horizontally disposed and the front panel 30 resting on the rear panel 31. The tailgate 42 of the pick-up truck 33 is lowered and the folded panels 30, 31 are placed on top of the cargo bed 36 with the hinges 70 positioned between the inner flanges 51 of the upper rails 49 slightly rearward of the retainer posts 53 attached to the rails 49. The panels 30, 31 are then moved horizontally forward to engage the caliper jaws 80 of the rear hinge plates 73 with the retainer posts 53 as shown in FIG. 8. As a final step, the front cover 30 is rotated and lowered to a horizontal covering position of the cargo bed 36.

From the foregoing, it will be appreciated that the tonneau cover 43 is easily and quickly mounted to the cargo bed 36. It will be further appreciated that during the engagement of the caliper jaws 80, 81 with the retainer posts 53 there is no necessity to align closely fitting members, such as pins and holes as is the case with existing demountable tonneau covers.

Referring now to FIGS. 17 through 20, inclusive, an alternate embodiment 90 of the invention is disclosed therein comprising a center panel 91 and two end panels 92, 93 mounted for rotation about a pair of axes which are transverse to the cargo bed 36. It will be observed that in this embodiment 90 both caliper jaws 80, 81 are incorporated in the combination hinge and caliper 70 which connect the front panel 92 to the center panel 91 whereas only the rear jaw 80 is incorporated in the hinge 94 which connects the rear 93 panel to the center 91 panel.

Figure 19:
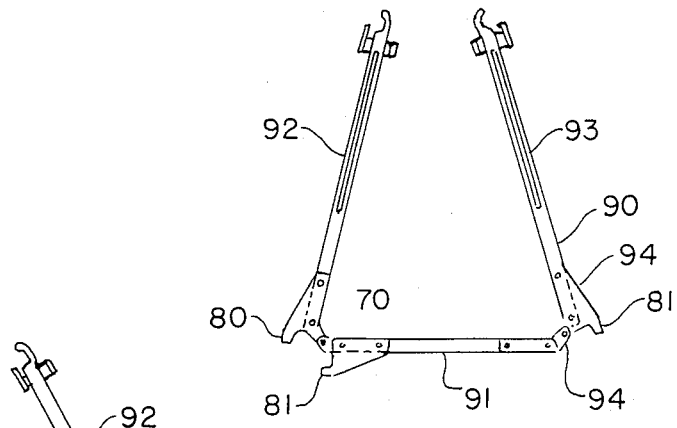
FIG. 19 is a side elevation view of the tonneau cover of FIG. 17 with the front and rear panels in elevated positions.
Figure 20:
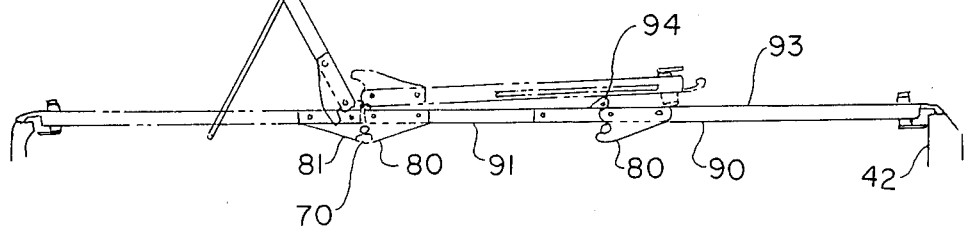
FIG. 20 is a side elevation view of the tonneau cover of FIG. 17 with the rear cover resting on the center panel and the front panel supported by a prop rod in an elevated position.

From FIGS. 19 and 20 it will be understood that the alternate embodiment 90 is installed by first engaging the jaws 80, 81 of the front hinges 70 with the corresponding retainer posts 53 in the aforedescribed manner and then engaging the jaws 80 of the rear hinges 94 with the rear retainer posts 53.

Although two embodiments of the subject invention and the manner of using the same have been described it will be appreciated that other embodiments can be provided by changes in the size, shape and arrangement of parts without departing from the spirit thereof.

I claim:

1. In combination with a pick-up truck of the type having an open bed for carrying cargo bounded at the side margins by a pair of spaced apart vertical panels in parallel relationship, bounded at the forward end margin by a fixed wall extending across the forward portion of said side panels, and bounded at the opposite rear end margin by a rotatably mounted gate extending across the rearward portion of said side panels; a tonneau cover for covering said open bed, said tonneau cover comprising a front panel having a forward edge portion disposed proximally to the forward fixed wall of said open bed, a rear panel rotatably joined to said front panel, said front and rear panels being laminated structures comprising thin upper and lower outer sheets; a peripheral molding, said molding having a horizontal upper wall, a spaced apart lower horizontal wall, an interconnecting vertical wall recessed inwardly from the inner edges of the upper and lower walls for receiving a cellular core, and a pair of spaced apart vertical ribs extending downwardly from the outer portion of the upper wall for receiving a seal; a cellular core bonded to said upper and lower sheets; and a resilient seal retained within the space between said downward extending ribs.

2. In combination with a pick-up truck of the type having an open bed for carrying cargo bounded at the side margins by a pair of spaced apart vertical panels in parallel relationship, bounded at the forward end margin by a fixed wall extending across the forward portion of said side panels, and bounded at the opposite rear end margin by a rotatably mounted gate extending across the rearward portion of said side panels; a tonneau cover for covering said open bed, said tonneau cover comprising a front panel having a forward edge portion disposed proximally to the forward fixed wall of said open bed, a rear panel rotatably joined to said front panel, said front and rear panels comprised of thin upper and lower outer sheets, a cellular core bonded to said upper and lower sheets; a peripheral molding attached to the outer edge portions of said upper and lower sheets, and a resilient seal attached to the underside of said molding, said panels being rotatably adjustable about an axis, which is transverse to said side margins of said open bed, to a position of covering relationship to said bed and to a position of uncovering relationship to said bed; and a caliper hinge at each side of the cover for rotatably joining together said front and rear panels and for retaining said panels to the pick-up truck, each of said caliper hinges comprising a retaining post fixedly attached to the side walls of said open bed and extending laterally inwardly into said open bed and a pair of rotatably connected companion latch members, one of said latch members being fixedly attached to each side of said front panel and the other companion member being fixedly attached to each side of said rear panel, each latch member of said front panel and the other companion member being fixedly attached to each side of said rear panel, each latch member of the front panel having a jaw which is in rearward facing embracing relationship to one of said retainer posts when the front panel is in covering relationship and which is in forward facing non-embracing relationship to said retainer post when the front panel is in uncovering relationship, such that when said front panel is in the uncovering relationship said cover is removable from said pick-up truck and when said front panel is in covering relationship the forward facing caliper jaws cooperate with the fixed wall of the bed to prevent removal of the tonneau cover from the vehicle.

* * * * *